United States Patent
Faruque et al.

(10) Patent No.: US 9,102,300 B2
(45) Date of Patent: Aug. 11, 2015

(54) VEHICLE OCCUPANT RESTRAINT SYSTEM

(71) Applicant: FORD GLOBAL TECHNOLOGIES, LLC, Dearborn, MI (US)

(72) Inventors: Mohammed O. Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/147,061

(22) Filed: Jan. 3, 2014

(65) Prior Publication Data

US 2015/0191143 A1    Jul. 9, 2015

(51) Int. Cl.
*B60R 21/26* (2011.01)
*B60R 21/207* (2006.01)
*B60R 21/231* (2011.01)
*B60R 21/217* (2011.01)

(52) U.S. Cl.
CPC ............... *B60R 21/26* (2013.01); *B60R 21/207* (2013.01); *B60R 21/23138* (2013.01); *B60R 21/217* (2013.01); *B60R 2021/23107* (2013.01); *B60R 2021/23146* (2013.01)

(58) Field of Classification Search
CPC ............ B60R 21/207; B60R 2021/23107; B60R 21/217; B60R 2021/23146
USPC ................................................... 280/730.2
See application file for complete search history.

(56) References Cited

U.S. PATENT DOCUMENTS

| | | | | |
|---|---|---|---|---|
| 3,779,577 | A * | 12/1973 | Wilfert | 280/730.1 |
| 5,324,071 | A * | 6/1994 | Gotomyo et al. | 280/730.1 |
| 5,588,670 | A * | 12/1996 | Storey et al. | 280/730.2 |
| 5,738,368 | A * | 4/1998 | Hammond et al. | 280/730.1 |
| 5,975,565 | A * | 11/1999 | Cuevas | 280/730.1 |
| 7,669,888 | B2 * | 3/2010 | Sato et al. | 280/730.2 |
| 8,231,138 | B2 * | 7/2012 | Sadr et al. | 280/730.2 |
| 8,469,395 | B2 * | 6/2013 | Richez et al. | 280/730.2 |
| 8,702,123 | B2 * | 4/2014 | Mazanek et al. | 280/730.2 |
| 2001/0009327 | A1 * | 7/2001 | Zeigler | 280/735 |
| 2006/0202452 | A1 * | 9/2006 | Breed et al. | 280/730.2 |
| 2007/0013174 | A1 * | 1/2007 | Riedel et al. | 280/730.2 |
| 2007/0108745 | A1 * | 5/2007 | Belwafa et al. | 280/730.2 |
| 2009/0020988 | A1 * | 1/2009 | Sato et al. | 280/730.2 |
| 2012/0133114 | A1 * | 5/2012 | Choi et al. | 280/728.2 |
| 2012/0223550 | A1 * | 9/2012 | Mazanek et al. | 297/216.1 |
| 2013/0026803 | A1 | 1/2013 | Islam et al. | |
| 2013/0088056 | A1 * | 4/2013 | Quatanens et al. | 297/216.13 |
| 2013/0270878 | A1 | 10/2013 | Adachi et al. | |
| 2013/0341975 | A1 * | 12/2013 | Schneider et al. | 297/163 |

FOREIGN PATENT DOCUMENTS

| | | |
|---|---|---|
| EP | 1031475 A2 | 8/2000 |
| JP | 2000103310 A | 4/2000 |

* cited by examiner

*Primary Examiner* — Karen Beck
(74) *Attorney, Agent, or Firm* — Frank A. MacKenzie; Brooks Kushman P.C.

(57) ABSTRACT

An exemplary vehicle occupant restraint system may include a side airbag attached to a side portion of a vehicle seat. The system may further include a rear airbag attached to a rear portion of the vehicle seat. The system can also have a single inflator connected to the side airbag and the rear airbag, such that the inflator is configured to cushion a first occupant and a second occupant during a crash event with the side airbag and the rear airbag, respectively.

20 Claims, 4 Drawing Sheets

VEHICLE OCCUPANT RESTRAINT SYSTEM

TECHNICAL FIELD

This disclosure relates to a vehicle occupant restraint system.

BACKGROUND

Car manufacturers have developed airbag modules that reduce injuries to the head and neck of rear seat occupants. One example is a side curtain airbag system that is mounted within the headliner above rear vehicle door and window. This system can include its own dedicated inflator, which is used separately and wholly independently from other vehicle occupant restraint systems that have their own inflators, such as a side airbag system for front seat vehicle occupants. This multiplicity of components can increase vehicle weight, add complexity in wire routing, increased costs and interfere with child seats positioned in rear seats.

It would therefore be desirable to provide an airbag system for rear vehicle occupants that reduces vehicle weight, decreases vehicle costs and improves safety of rear vehicle occupants.

SUMMARY

An exemplary vehicle occupant restraint system may include a side airbag attached to a side portion of a vehicle seat. The system may further include a rear airbag attached to a rear portion of the vehicle seat. The system can also have a single inflator connected to the side airbag and the rear airbag, such that the inflator is configured to cushion a first occupant and a second occupant during a crash event with the side airbag and the rear airbag, respectively.

An exemplary vehicle occupant restraint system may include a vehicle seat having a side portion and a rear portion. The system may have a side airbag attached to the side portion of the vehicle seat and a rear airbag attached to the rear portion of the vehicle seat. The system may also have a single inflator connected to the side airbag and the rear airbag, such that the inflator is configured to cushion a first occupant and a second occupant during a crash event with the side airbag and the rear airbag, respectively. A portion of the rear airbag is slidably attached to the rear portion of the vehicle seat to permit the vehicle seat to move between an upright position and a reclined position.

An exemplary method of operating a vehicle occupant restraint system may include slidably attaching a rear airbag to a rear portion of a seatback of a vehicle seat. The method may also include moving a portion of the rear airbag toward a seat bottom of the vehicle seat when the seat is moved to a reclined position. Moreover, the method may include moving the portion of the rear airbag toward an upper end of the vehicle seat when the seat is moved to an upright position. The method may also include discharging air from a single inflator to a side airbag and the rear airbag.

DETAILED DESCRIPTION

Figure 1:
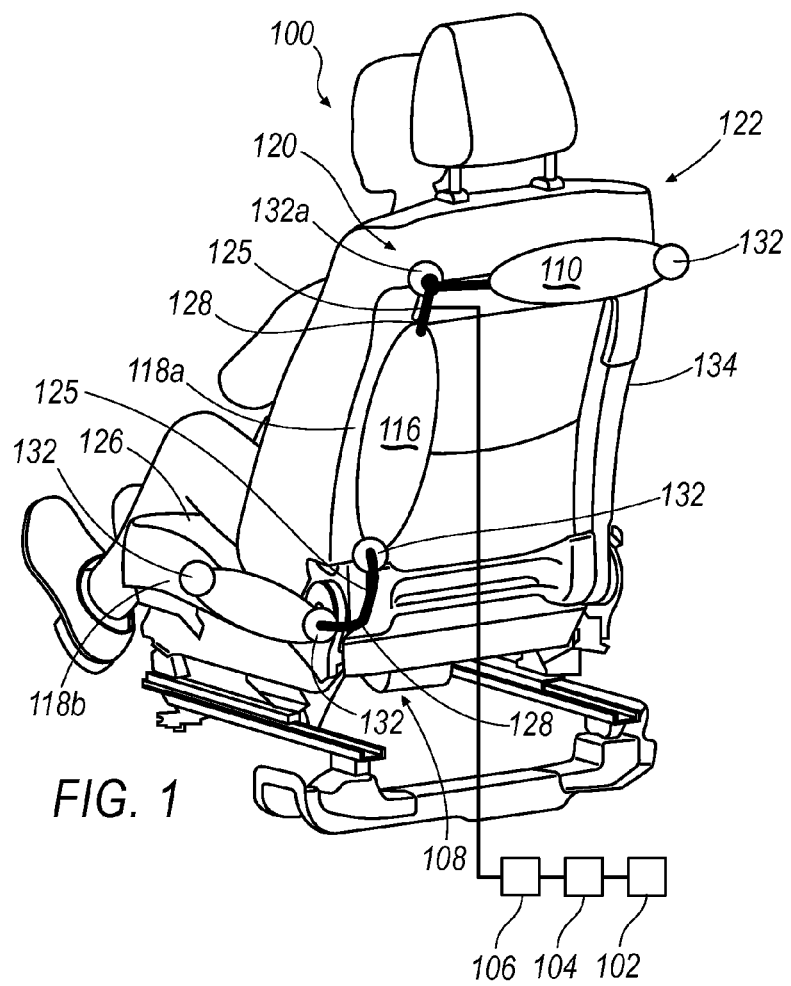
FIG. 1 is a rear perspective view of an exemplary vehicle occupant restraint system using a single inflator to inflate both a side airbag and a rear airbag.

Referring now to the discussion that follows and also to the drawings, illustrative approaches are shown in detail. Although the drawings represent some possible approaches, the drawings are schematic in nature and thus not drawn to scale, with certain features exaggerated or removed to better illustrate and explain the present disclosure. Further, the descriptions set forth herein are not intended to be exhaustive or otherwise limit or restrict the claims to the precise forms and configurations shown in the drawings and disclosed in the following detailed description.

An exemplary vehicle occupant restraint system can include a single inflator to inflate a side airbag to cushion a front seat occupant and a rear airbag to cushion a rear seat occupant. In one example, the side airbag and the rear airbag can be integral portions of one combined airbag, and the inflator can have a single chamber connected to the side airbag and the rear airbag. The inflator can be configured to cushion a first occupant and a second occupant during a crash event with the first airbag and the second airbag, respectively. As one example, the inflator can communicate with the side airbag, such that the inflator can inflate the side airbag, which in turn directs gas to the rear airbag to inflate the same. By way of another example, the inflator can have two chambers that inflate a respective one of the side airbag and the rear airbag. One or more portions of the rear airbag, side airbag, the inflator or any combination thereof may be slidably attached to a vehicle seat, so as to permit the seatback of the vehicle seat to move between an upright position and a reclined position while securely attaching the system to the vehicle seat.

Referring to FIG. 1, an exemplary vehicle occupant restraint system 100 ("system") can include one or more frontal crash sensors 102 that generate a crash signal in response to detecting a front vehicle collision. As one example, the accelerometer is a MEMS accelerometer, which is a small integrated circuit with integrated micro mechanical elements that move in response to rapid deceleration. This motion causes a change in capacitance, which is detected by the electronics on the chip that then generates the crash signal in response to the same. However, the system may have any suitable crash sensors that generate a crash signal in response to detecting a vehicle collision.

Then system 100 may further include a controller 104 that receives the crash signal from the sensor 102, and generates an actuation signal based on the crash signal. In addition, the system 100 may have one signal inflator 106 that receives the actuation signal from the controller 104 and inflates the side airbag 108 and the rear airbag 110 based on the actuation signal. In this example, the inflator 106 (FIG. 2) includes two chambers 112a, 112b that communicate with a respective one of two manifolds 114a, 114b connected to the side airbag and the rear airbag. However, another exemplary inflator 306

Figure 3:
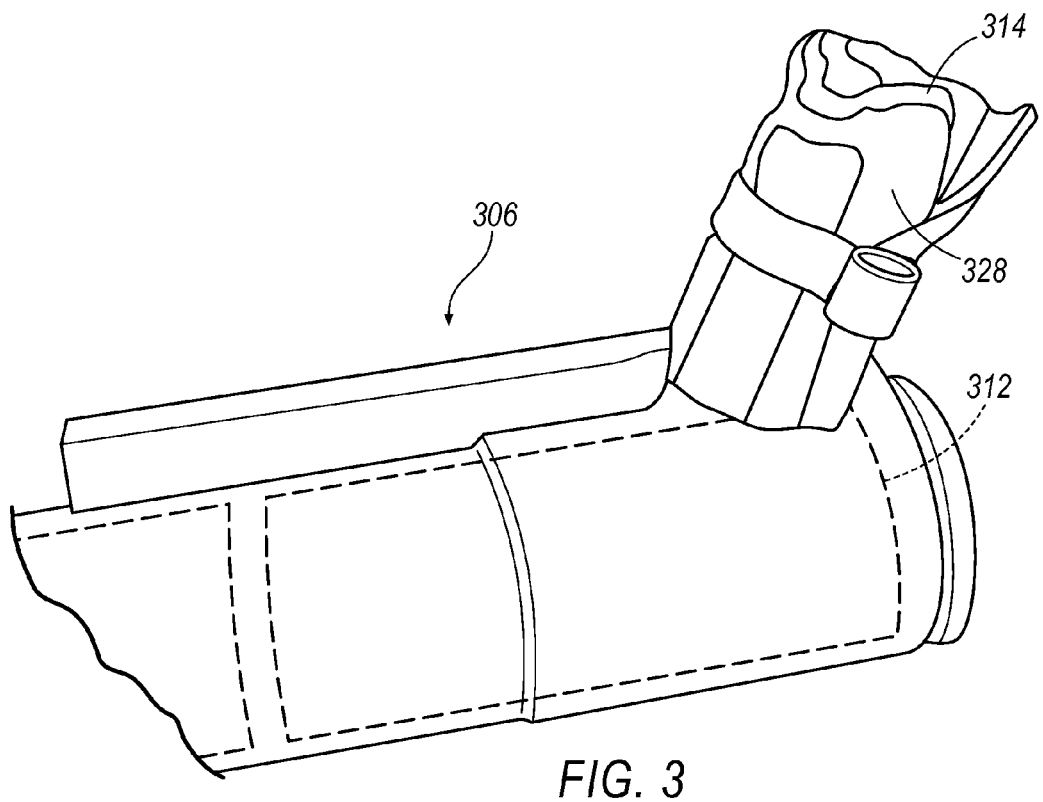
FIG. 3 is an enlarged view of another exemplary inflator of the system of FIG. 1, showing the inflator having a single chamber communicating with a single manifold to sequentially inflate the side airbag that in turn inflates the rear airbag.

(FIG. 3) can instead include single chamber 312 that communicates with a manifold 314 connected to the side airbag, which in turn communicates with the rear airbag.

Referring back to FIG. 1, the exemplary side airbag 108 is attached to a side portion 118a, 118b of a vehicle seat 122. In particular, the side airbag 108 may have a thorax airbag 116, which is anchored to the side of a seatback 120 of the vehicle seat 122 and communicates with the manifold 114b (FIG. 2) to receive gas discharged from the chamber 112b of the inflator 106. The side airbag 108 may further include a pelvis airbag 124, which is attached to an outboard side 118b of a seat bottom 126 of the vehicle seat 122 and communicates with the thorax airbag 116 to receive gas from the thorax airbag 116. In another example, the pelvis airbag can communicate directly with the inflator, and the thorax airbag can in turn communicate with the pelvis airbag, such that the inflator first inflates the pelvis airbag that in turn inflates the thorax airbag.

At least a portion of the exemplary rear airbag 110 may be attached to the rear side 118a of a seatback 120 of the seat 122 and may communicate with the manifold 114a (FIG. 2) to receive gas from the chamber 112a. Moreover, the rear airbag 110 in this form may be carried by an upper portion 120a of the seatback 120 and spaced apart from an intermediate portion of the seatback, such that the inflated rear airbag 110 can cushion the head of a rear seat occupant to reduce head and neck injuries without interfering with, for example, a child seat located in the rear seat. A single inflator 106 may inflate the rear airbag 110 and also inflate the thorax airbag 116 and the pelvis airbag 124 through successive fill tube connectors 125 to cushion front and rear seat occupants, in response to the actuation signal.

Figure 4:
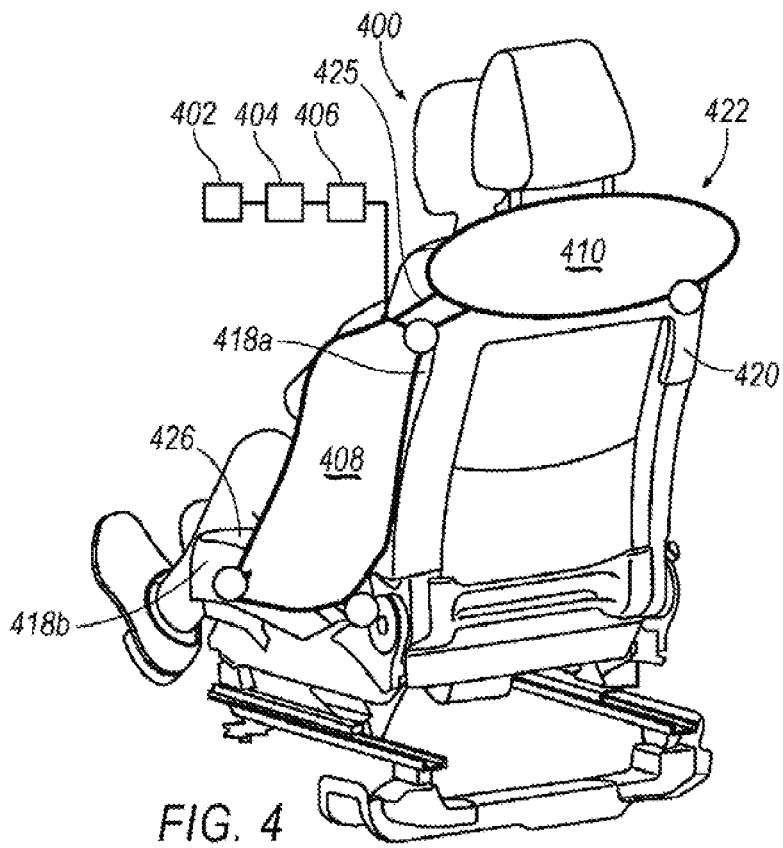
FIG. 4 is a rear perspective view of another exemplary vehicle occupant restraint system using a single inflator to inflate both a side airbag and a rear airbag.

Referring to FIG. 4, another exemplary system 400 may have a side airbag 408, a rear airbag 410 and an inflator 406, and is substantially similar to the system 100 of FIG. 1, which has corresponding components, such as crash sensor 402, controller 404, a side portion 418a, 418b of a vehicle seat 422, seat bottom 426, and seat back 420, identified by similar reference numerals but in the 400 series. However, the system 400 may include a single inflator 406 that has a single chamber that communicates with a single manifold, as compared to the inflator 106 of FIG. 1 having two chambers 112a, 112b communicating with a respective one of manifolds 114a, 114b. In this respect, the inflator may be substantially similar to the inflator 306 shown in FIG. 3. The inflator 406 may generate gas in the single chamber and direct gas through the manifold into the side airbag 408, which in turn communicates with a rear airbag 410 via a fill tube connector 425 for inflating the same.

Figure 2:
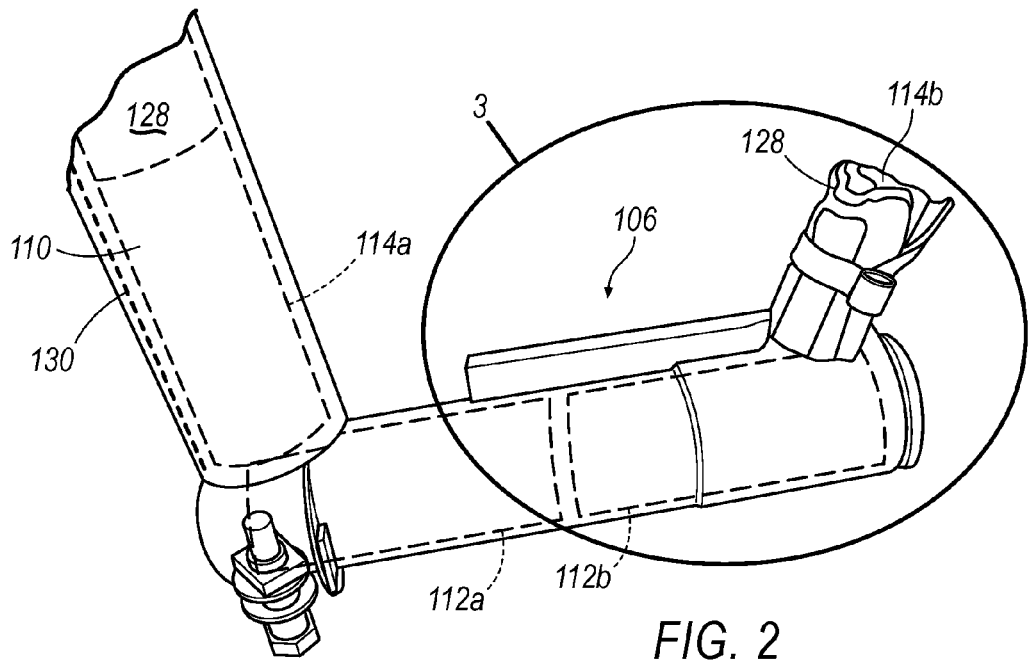
FIG. 2 is an enlarged view of an exemplary inflator of the system of FIG. 1, showing the inflator having a pair of chambers communicating with a respective one of two manifolds to inflate the side airbag and the rear airbag.

As best shown in FIG. 2, the manifold 114a and the rear airbag 110 may be contained within fill tube webbing 128 when the airbags are in a non-deployed state. Of course, the other manifold and the side airbag may be disposed within the fill tube webbing 128. In addition, the fill tube webbing 128 may have one or more rip seams 130 to permit the airbags to inflate through opened rip seams and extend from the seat 122 when the airbags are in a deployed state. The exemplary fill tube webbing 128 and manifold 114b therein may be clamped to the inflator 106. However, various suitable fasteners may be used to attach the fill tube webbing and the manifold to the inflator. Referring back to FIG. 1, the system 100 may include a plurality of tethers 132 that attach the fill tube webbing 128 to the vehicle seat 122.

Figure 5:
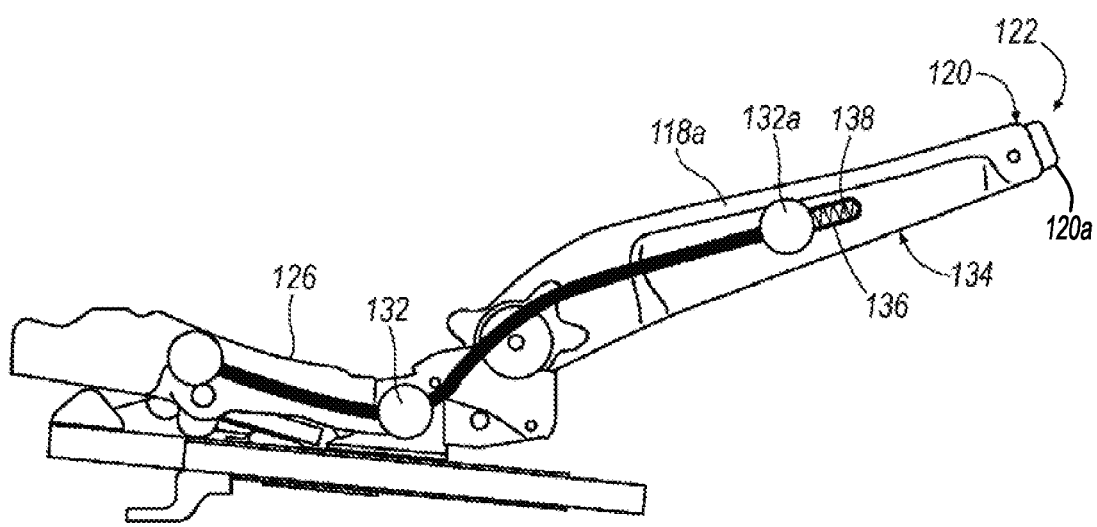
FIG. 5 is an enlarged side view of a vehicle seat if the system of FIG. 1, showing the seat moved to a reclined position.

The side airbag, the rear airbag, the inflator or any combination thereof are slidably attached to the vehicle seat, such that the seatback 120 that is pivotally attached to the seat bottom 126 may move between an upright position and a reclined position. In this example, as generally shown in FIG. 5, an outboard side of the rear airbag 110 is slidably attached to a vehicle frame 134 of the seatback 120. In particular, the system 100 can have an adjustable tether 132a slidably carried within a slot 136 formed in the vehicle frame 134. In this respect, the tether 132a may move downward toward the seat bottom 126, to permit the seatback to move to the reclined position. Furthermore, the system 100 can include a biasing member 138, such as a spring, which moves the tether 132a upward away from the seat bottom 126, so as to move the tether 132a upward when the seatback is in the upright position thereby disposing the rear airbag 110 in the desired position to cushion a head of a rear seat occupant without interfering with a child seat.

Figure 6:
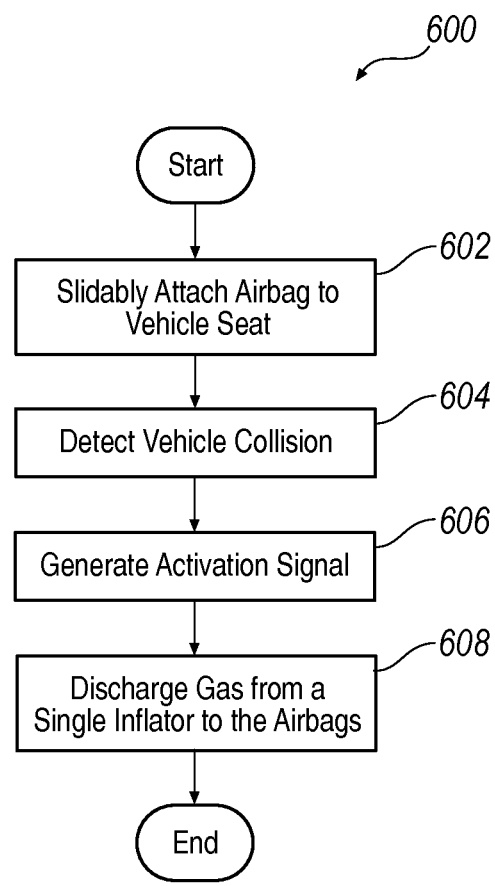
FIG. 6 is a flow chart of an exemplary method of operating the vehicle occupant restraint system of FIG. 1.

Referring to FIG. 6, an exemplary method 600 of operating the system 100 of FIG. 1 is illustrated. At step 602, the rear airbag 110 is slidably attached to the seatback 120 to permit the seatback 120 to move between the reclined position and the upright position. In particular, the outboard portion of the rear airbag 110 is moved toward the seat bottom 126 when the seat 122 is moved to the reclined position, and the outboard portion of the rear airbag 110 is moved toward the upper end 120a of the vehicle seat 122 when the seat 122 is moved to the upright position. The biasing member may attach the rear airbag to the seatback 120 so as to move the rear airbag 110 toward the upper end 120a of the seatback 120. However, any combination of the side airbag, the inflator and the rear airbag may be slidably attached to various portions of the vehicle seat.

At step 604, one or more sensors 102 generate the crash signal in response to detecting a vehicle collision. The sensor, in this example, may be a MEMS. However, the sensor may be other suitable sensors.

At step 606, the controller 104 generates an actuation signal in response to at least receiving the crash signal from the sensor 102. The actuation signal may be based on a plurality of crash signals in conjunction with any suitable computer algorithm to deploy the airbags.

At step 608, the inflator 106 inflates the side airbag 108 and the rear airbag 110 in response to receiving the actuation signal from the controller 104. This step may be accomplished by discharging gas directly from one chamber 112a of the single inflator 106 to the rear airbag 110, and discharging gas directly from another chamber 112b to the side airbag. However, this step may instead be accomplished by discharging gas from the single inflator 106 through the side airbag 108 and into the rear airbag 110 via the respective fill tube connector 125.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A vehicle occupant restraint system, comprising:
   a side airbag attached to a side portion of a vehicle seat;
   a rear airbag attached to a rear portion of the vehicle seat; and
   a single inflator connecting the side airbag and the rear airbag, such that the single inflator is configured to cushion a first occupant and a second occupant during a crash event with the side airbag and the rear airbag, respectively.

2. The vehicle occupant restraint system of claim 1, wherein the single inflator communicates with a single manifold that in turn communicates with the side airbag, and the side airbag communicates with the rear airbag, such that the inflator inflates the side airbag which in turn inflates the rear airbag through a fill tube connector.

3. The vehicle occupant restraint system of claim 2, wherein the single inflator has a single chamber communicating with the single manifold.

4. The vehicle occupant restraint system of claim 1, wherein the single inflator communicates with a pair of manifolds that in turn communicate with a respective one of the side airbag and the rear airbag to directly inflate the side airbag and the rear airbag.

5. The vehicle occupant restraint system of claim 4, wherein the single inflator includes a pair of chambers communicating with a respective one of the manifolds to inflate the side airbag and the rear airbag.

6. The vehicle occupant restraint system of claim 1, further comprising a pair of tubes having a respective one of the manifolds contained therein.

7. The vehicle occupant restraint system of claim 1, wherein the tubes and the manifolds are clamped to the single inflator.

8. The vehicle occupant restraint system of claim 1, wherein the rear airbag is movable between a non-deployed state and a deployed state, and the rear airbag in the non-deployed state is disposed within a tube.

9. The vehicle occupant restraint system of claim 8, wherein the rear airbag in the deployed state extends through an opened rip seam on the tube.

10. A vehicle occupant restraint system, comprising:
    a vehicle seat having a side portion and a rear portion;
    a side airbag attached to the side portion of the vehicle seat;
    a rear airbag attached to the rear portion of the vehicle seat; and
    a single inflator connected to the side airbag and the rear airbag, such that the inflator is configured to cushion a first occupant and a second occupant during a crash event with the side airbag and the rear airbag, respectively;
    wherein a portion of the rear airbag is slidably attached to the side portion of the vehicle seat to permit the vehicle seat to move between an upright position and a reclined position.

11. The vehicle occupant restraint system of claim 10, wherein the vehicle seat includes a seat bottom and seatback pivotally attached to the seat bottom, and the side airbag is attached to the seat bottom and the rear airbag is attached to the seatback.

12. The vehicle occupant restraint system of claim 11, wherein the seatback includes a slot and a tether for the rear airbag, the tether being received within the slot and slidably attaching the rear airbag to the seatback.

13. The vehicle occupant restraint system of claim 10, further comprising a biasing member attached to the rear airbag, the biasing member moving the rear airbag to an upper portion of the vehicle seat when the vehicle seat is disposed in the upright position.

14. The vehicle occupant restraint system of claim 10, wherein the single inflator communicates with a single manifold that in turn communicates with the side airbag, and the side airbag communicates with the rear airbag, such that the inflator inflates the side airbag which in turn inflates the rear airbag.

15. The vehicle occupant restraint system of claim 14, wherein the single inflator has a single chamber communicating with the single manifold.

16. The vehicle occupant restraint system of claim 10, wherein the single inflator communicates with a pair of manifolds that in turn communicate with a respective one of the side airbag and the rear airbag to directly inflate the side airbag and the rear airbag.

17. The vehicle occupant restraint system of claim 16, further comprising:
    a sensor generating a crash signal in response to detecting a vehicle collision; and
    a controller receiving the crash signal and generating an actuation signal in response to the crash signal;
    wherein the single inflator discharges gas directly into at least the side airbag in response to the actuation signal.

18. A method of operating a vehicle occupant restraint system comprising:
    slidably attaching a rear airbag to a rear portion of a seatback of a vehicle seat;
    moving a portion of the rear airbag toward a seat bottom of the vehicle seat when the seat is moved to a reclined position;
    moving the portion of the rear airbag toward an upper end of the vehicle seat when the seat is moved to an upright position; and
    discharging air from a single inflator to a side airbag and the rear airbag.

19. The method of claim 18, wherein a biasing member attaches a portion of the rear airbag to the seatback.

20. The method of claim 18, further comprising one of:
    discharging gas directly from the single inflator to the rear airbag; through a single manifold; and
    discharging gas from the single inflator through the side airbag and into the rear airbag.

* * * * *